US012704175B2

(12) United States Patent
Taxil

(10) Patent No.: US 12,704,175 B2
(45) Date of Patent: Aug. 11, 2026

(54) START-UP OR DISENGAGEMENT METHOD FOR AN ELECTRO-HYDRAULIC TRANSMISSION

(71) Applicant: POCLAIN HYDRAULICS INDUSTRIE, Verberie (FR)

(72) Inventor: Loris Taxil, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 18/723,086

(22) PCT Filed: Dec. 22, 2022

(86) PCT No.: PCT/FR2022/052471

§ 371 (c)(1),
(2) Date: Jun. 21, 2024

(87) PCT Pub. No.: WO2023/118754

PCT Pub. Date: Jun. 29, 2023

(65) Prior Publication Data

US 2025/0060033 A1 Feb. 20, 2025

(30) Foreign Application Priority Data

Dec. 22, 2021 (FR) ...................................... 2114253

(51) Int. Cl.
*F16H 61/4139* (2010.01)
*F16H 61/4035* (2010.01)
(Continued)

(52) U.S. Cl.
CPC ..... *F16H 61/4035* (2013.01); *F16H 61/4069* (2013.01); *F16H 61/4139* (2013.01);
(Continued)

(58) Field of Classification Search
CPC ............. F16H 61/4035; F16H 61/4043; F16H 61/4069; F16H 61/4139; F16H 61/42; F16H 61/431; F16H 61/47; F16H 61/472
See application file for complete search history.

(56) References Cited

U.S. PATENT DOCUMENTS 7,201,702 B2 * 4/2007 Legner .................. F16H 61/444 477/52
8,584,452 B2 * 11/2013 Lloyd .................. F16H 61/448 60/494
(Continued)

FOREIGN PATENT DOCUMENTS

FR 1575997 A 7/1969
FR 2958886 A1 10/2011
(Continued)

OTHER PUBLICATIONS

Search Report for French Patent Application No. 2114253, dated Aug. 2, 2022, 8 pages.
International Search Report for PCT/FR2022/052471, dated Mar. 21, 2023, 4 pages.

*Primary Examiner* — Michael Leslie
(74) *Attorney, Agent, or Firm* — Lippes Mathias LLP

(57) ABSTRACT

A process for start-up of a propulsion system for a vehicle displacement component. The propulsion system includes a hydraulic pump, a hydraulic motor fed by the hydraulic pump via a closed-loop hydraulic circuit, and an electric motor. The process for start-up includes the following steps, given a configuration when the propulsion system is at a standstill, in which the electric motor, the hydraulic pump and the feed pump are at a standstill, and the hydraulic motor is disengaged: start-up of the feed pump, starting up of the electric motor, setting in rotation of the hydraulic pump, adjustment of the displacement of the hydraulic pump and/or of the rotational speed of the electric motor for providing a
(Continued)

flow rate corresponding to a setpoint on the hydraulic motor, start-up of the hydraulic motor.

12 Claims, 3 Drawing Sheets

(51) Int. Cl.

| | |
|---|---|
| ***F16H 61/4069*** | (2010.01) |
| ***F16H 61/431*** | (2010.01) |
| ***F16H 61/444*** | (2010.01) |
| ***F16H 61/465*** | (2010.01) |
| ***F16H 61/47*** | (2010.01) |
| ***F16H 61/472*** | (2010.01) |

(52) U.S. Cl.
CPC ......... *F16H 61/431* (2013.01); *F16H 61/444* (2013.01); *F16H 61/465* (2013.01); *F16H 61/47* (2013.01); *F16H 61/472* (2013.01)

(56) References Cited

U.S. PATENT DOCUMENTS

| | | | | |
|---|---|---|---|---|
| 8,857,172 | B2 * | 10/2014 | Prigent | F16H 61/4139 60/489 |
| 8,978,375 | B2 * | 3/2015 | Prigent | F16H 61/4096 60/489 |
| 9,896,935 | B2 * | 2/2018 | Prigent | F03C 1/0478 |
| 10,279,789 | B2 * | 5/2019 | Prigent | F16H 61/431 |
| 10,350,994 | B2 * | 7/2019 | Didierjean | B60K 17/356 |
| 2024/0384788 | A1 * | 11/2024 | Taxil | F16H 61/468 |
| 2025/0075792 | A1 * | 3/2025 | Taxil | F16H 61/435 |

FOREIGN PATENT DOCUMENTS

| | | | | | |
|---|---|---|---|---|---|
| FR | 3026811 | A1 | | 4/2016 | |
| WO | WO-2022084623 | A1 | * | 4/2022 | F16H 61/4139 |

* cited by examiner

START-UP OR DISENGAGEMENT METHOD FOR AN ELECTRO-HYDRAULIC TRANSMISSION

BACKGROUND OF THE DISCLOSURE

This presentation relates to an improved process for start-up and a disengagement process for an electrohydraulic transmission, and in particular for a temporary assistance device.

STATE OF THE ART

Different solutions are known which propose integrating an electrohydraulic propulsion device for vehicles or engines having a primary thermal motor or a primary electric motor.

Different transmission architectures have been proposed for implementing propulsion of a vehicle, especially a vehicle combining hydraulic drive elements with thermal or electrical elements, and in particular for the case of temporary assistance by means of hydraulic assistance, for example electrohydraulic.

However, the different architectures proposed raise problems in terms of optimisation and execution, due to the characteristics of the different elements which involve specific restrictions, with the result that the architectures and the processes commonly used cannot be adapted.

The present invention aims to respond to these problems at least partially.

SUMMARY OF THE DISCLOSURE

The present invention relates to a process for starting up a secondary propulsion system for a vehicle displacement component, the vehicle comprising a primary propulsion system, said propulsion system comprising

- a hydraulic pump having a discharge and an admission,
- a hydraulic motor having a discharge and an admission, adapted to drive said displacement component in rotation and which can be selectively engaged or disengaged from said displacement component, the hydraulic motor being fed by the hydraulic pump via a closed-loop hydraulic circuit comprising a feed pump, the hydraulic circuit comprising an engagement valve adapted to selectively connect or isolate the hydraulic motor relative to the hydraulic pump or isolate the hydraulic motor relative to the hydraulic pump (30) and connect the discharge of the hydraulic pump to its admission, and connect the discharge of the hydraulic motor to its admission,
- an electric motor, adapted to drive the hydraulic pump,
- a source of electric power, adapted to feed the electric motor, said process for start-up comprising the following steps, given a configuration where the propulsion system is at a standstill, in which the electric motor, the hydraulic pump and the feed pump are at a standstill, and the hydraulic motor is disengaged:
- start-up of the feed pump,
- starting up of the electric motor so as to drive the hydraulic pump in rotation,
- adjustment of the displacement of the hydraulic pump and/or of the rotational speed of the electric motor to provide a flow rate corresponding to a setpoint applied to the hydraulic motor,
- control of the engagement valve to carry out start-up of the hydraulic motor.

According to an example, the engagement valve has three ports connected to the hydraulic motor, and is adapted to connect the admission and the discharge of the hydraulic motor to a crankcase of the hydraulic motor and to a feed circuit of the hydraulic circuit, the hydraulic motor being of disengagement type by retractation of pistons into a cylinder block.

According to an example, the hydraulic motor is fitted with return springs tending to position the pistons in a retracted position in the cylinder blocks.

According to an example, the setpoint applied during adjustment of the displacement corresponds to a speed of advance of the vehicle such that the hydraulic motor provides no torque.

According to an example, following control of the engagement valve, a setpoint is applied to the system such that the hydraulic motor provides non-zero traction torque.

According to an example, the feed pump is driven in rotation by the electric motor, and wherein the starting up of the electric motor is executed so as to put the feed pump into service.

According to an example, the feed pump is an electro-pump group independent of the electric motor.

According to an example, the displacement of the hydraulic pump and the rotational speed of the electric motor are controlled so as to create a setpoint and maintain a rotational speed of the electric motor greater than a lower threshold value.

According to an example, the displacement of the hydraulic pump and the rotational speed of the electric motor are controlled so as to create the setpoint by maximising the total output of the hydraulic pump and of the electric motor and maintain a rotational speed of the electric motor greater than the lower threshold value.

According to an example, the process comprises the following steps for disengagement of the propulsion system, given an engaged configuration of the propulsion system, in which the electric motor is in rotation, the hydraulic pump and the feed pump deliver a flow rate, and the hydraulic motor is engaged and drives the displacement component in rotation:

- control of displacement of the hydraulic pump and/or of the rotational speed of the electric motor so as to lower the pressure in the hydraulic circuit to achieve a resting pressure,
- control of the engagement valve so as to isolate the hydraulic motor from the hydraulic pump,
- zero displacement of the hydraulic pump and shutdown of the electric motor,
- shutdown of the feed pump.

The present invention also relates to a disengagement process of a secondary propulsion system for a vehicle displacement component, the vehicle comprising a primary propulsion system, said propulsion system comprising

- a hydraulic pump having a discharge and an admission,
- a hydraulic motor having a discharge and an admission, adapted to drive said displacement component in rotation and which can be selectively engaged or disengaged from said displacement component and which can be selectively engaged or disengaged from said displacement component, the hydraulic motor being fed by the hydraulic pump via a closed-loop hydraulic circuit comprising a feed pump, the hydraulic circuit comprising an engagement valve (80) adapted to selectively connect the hydraulic motor (40) to the hydraulic pump (30) or isolate the hydraulic motor (40) relative to the hydraulic pump (30) and connect the discharge of the hydraulic pump (30) to its admission, and connect the discharge of the hydraulic motor (40) to its admission, an electric motor, adapted to drive the hydraulic pump, a source of electric power, adapted to feed the electric motor, said disengagement process comprising the following steps, given a engaged configuration of the propulsion system, in which the electric motor is in rotation, the hydraulic pump and the feed pump deliver a flow rate, and the hydraulic motor is engaged and drives the displacement component in rotation:

control of the displacement of the hydraulic pump and/or of the rotational speed of the electric motor so as to lower the pressure in the hydraulic circuit to reach a resting pressure, control of the engagement valve so as to isolate the hydraulic motor of the hydraulic pump, zero displacement of the hydraulic pump and shutdown of the electric motor, shutdown of the feed pump.

The disengagement can for example be undertaken following the process for start-up described previously, after a phase of activity of the secondary propulsion system.

According to an example, the displacement of the hydraulic pump and the rotational speed of the electric motor are controlled so as to maintain a rotational speed of the electric motor greater than a lower threshold value as far as the shutdown step of the electric motor.

According to an example, the resting pressure is determined such that the hydraulic motor (40) applies zero torque.

The invention applies to any machine or engine having a traction chain or an electric drive, in particular agricultural machines, for example tractors and self-propelling sprayers, and construction machinery, e.g. compactors, forklifts, cherry pickers, mechanical shovels, bulldozers, vehicles, in particular trucks, lorries and powered trailers.

BRIEF DESCRIPTION OF DRAWINGS

The invention and its advantages will be better understood from reading the detailed description given hereinbelow of different embodiments of the invention given by way of non-limiting examples.

In all figures, elements in common are designated by identical reference numerals.

DETAILED DESCRIPTION OF THE PREFERRED EMBODIMENTS

Figure 1:
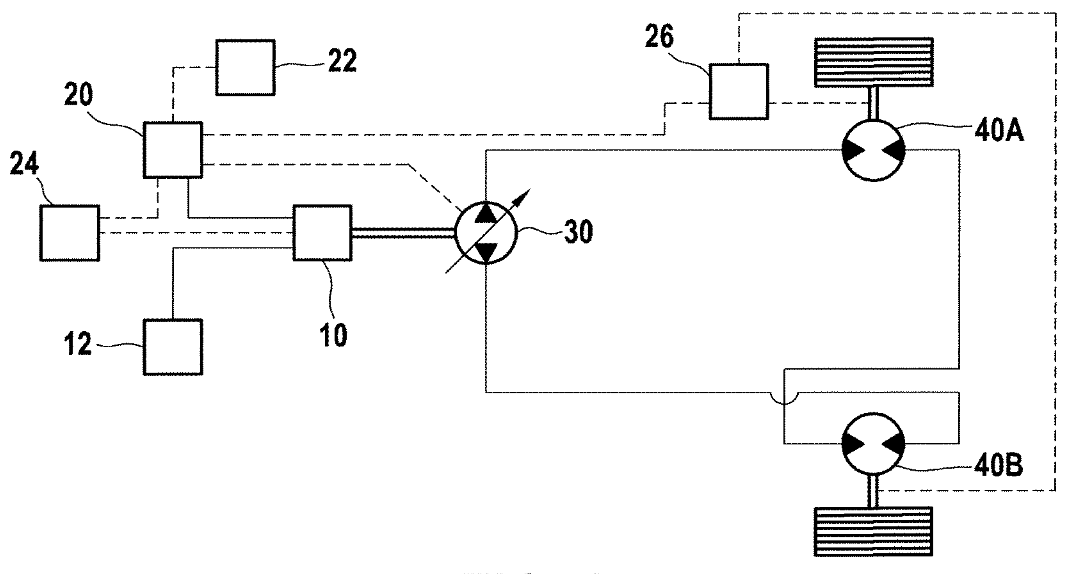
FIG. 1 is a schematic diagram which illustrates a vehicle or engine fitted with an electrohydraulic axle propulsion system.

FIG. 1 schematically illustrates a vehicle or engine fitted with a hydroelectric axle propulsion system.

This figure illustrates an electric motor 10 fed by a battery 12 and controlled by a controller 20. The electric motor 10 is for example of synchronous type with permanent magnets. The electric motor 10 can for example comprise an internal control card and a chopper or converter not shown in the figure. From a setpoint value received from the outside, the current is cut by the chopper in intensity and in frequency to drive the electric motor 10 at the required torque and speed. The electric motor 10 is coupled to a hydraulic pump 30. The hydraulic pump 30 is connected to a hydraulic circuit shown in simplified form, via which it drives one or more hydraulic motors adapted to drive a vehicle propulsion component in rotation. Displacement component means for example an axle or a wheel. In the example illustrated, the hydraulic pump 30 feeds two hydraulic motors 40A and 40B mounted in series, each of the hydraulic motors 40A and 40B driving a wheel of a vehicle in rotation. It is understood that this embodiment is not limiting, and that any type of hydraulic circuit can be associated with the hydraulic pump 30, comprising one or more hydraulic motors 40, driving a vehicle displacement component in rotation, especially an axle or a wheel.

The pump 30 is a variable displacement hydraulic pump, typically a hydraulic pump with axial pistons and inclined plate, the control of the inclination of the plate carrying out control of the displacement of the pump.

The hydraulic motor or hydraulic motors fed by the hydraulic pump 30 are typically fixed displacement hydraulic motors, for example hydraulic motors with radial pistons and multilobe cam.

The system such as proposed can be employed for example to carry out the main transmission of a vehicle, or also define hydraulic assistance on an axle secondary, as opposed to a primary axle driven by a primary motor of the vehicle. In the case of implementing hydraulic assistance, the system can be engaged permanently, periodically, or in predetermined conditions, for example when the speed of the vehicle is less than or equal to a predetermined speed.

The operation described hereinbelow remains unchanged irrespective of the application used.

The actuation of the propulsion system such as illustrated poses problems of control of the electric motor 10.

The controller 20 such as proposed is configured so as to execute control of the electric motor 20 and the hydraulic pump 30 to achieve operation ensuring the safety of components and optimising the output.

The controller 20 is typically connected to control components, and is therefore adapted to receive a setpoint, which typically results in an action by the user, and which will control the start-up of hydraulic assistance for example.

The setpoint is typically a flow rate setpoint which defines a flow rate target value to be delivered by the hydraulic pump 30, or a rotational speed setpoint defining a rotation target value for the displacement component driven by the system, for example a speed setpoint of the machine, or a rotation setpoint of wheels or an axle, or a rotational speed of a motor driving a displacement component such as a wheel. It is understood that such setpoints are equivalent.

The controller 20 such as proposed controls displacement of the hydraulic pump 30 and the rotational speed of the electric motor 10 so as to execute the setpoint and ensure a minimal rotational speed of the electric motor 10.

In fact, an electric motor tends to rise in temperature when operating at a low rotational speed and provides high torque, which causes the risk of degradation. The output of the electric motor 10 is also degraded if it is asked to supply excessive torque for a given speed.

The controller 20 such as proposed aims to ensure operation of the electric motor 10 at a rotational speed greater than or equal to a lower speed threshold value, which prevents the risk of overheating and therefore degradation of the electric motor 10.

The lower speed threshold value is determined by the computer as a function of data typically stored in a memory unit 22.

The lower speed threshold value can be a fixed value, for example between 800 and 1500 rpm or between 900 and 1200 rpm, or for example equal to 1000 rpm, or can be a variable value as a function of temperature.

The system can comprise a temperature sensor 24, adapted to measure a temperature characteristic of the operation of the electric motor 10. The temperature sensor 24 can for example be positioned near the electric motor 10 or against the electric motor 10 to measure its temperature, or can measure the ambient temperature.

The controller 20 can then determine the lower speed threshold value as a function of the temperature measured in this way. The lower threshold value Vmin is typically variable as a function of the temperature measured. The lower threshold value Vmin is typically determined to ensure the thermal stability of the system, and especially of the electric motor 10, such that the electric motor 10 rotates at a sufficiently high speed to ensure the discharge of heat, and avoid overheating of the electric motor 10.

In this way, the controller 20 is configured so as to prioritise the rotational speed of the electric motor 10 so that it is greater than or equal to the lower speed threshold value, in this way protecting the electric motor 10 from any overheating. The controller 20 adapts displacement of the hydraulic pump 30 to produce the setpoint value.

The controller 20 is typically configured so as to subsequently maximise the output of the hydraulic pump.

The controller 20 is therefore typically configured to control the displacement of the hydraulic pump and the rotational speed of the electric motor to achieve the setpoint value by maximising the total output of the hydraulic pump and of the electric motor while maintaining a rotational speed of the electric motor greater than a lower threshold value.

The memory unit 22 is typically previously loaded with data of operating characteristics of the hydraulic pump 30 and of the electric motor 10, typically output characteristics or characteristics indicating correspondences between an input value or setpoint value and output parameters of the element in question, for example in the form of charts or tables, and will determine the displacement of the hydraulic pump and the rotational speed of the electric motor 10 so as to maximise the total output as a function of the setpoint value and of the rotational speed of the electric motor 10, which is greater than or equal to the lower threshold value. The data constitute for example mapping of loss/output or operation/torque of the hydraulic pump 30 and of the electric motor 10, or of the displacement of the hydraulic pump as a function of the need in flow rate and of pressure delivered, and then define a plurality of operating points for the torque formed by the hydraulic pump 30 and the electric motor 10.

To attain the optimised point of operation, as a function of the data now loaded the torque and the power are determined as a function of the rotational speed so as to position the operating point of the hydraulic motor 10 at the point supplying the maximal available power.

The controller 20 is typically configured so as to present variable operation according to the drive speed of the axle or of the component driven by the electrohydraulic traction system, that is, non-linear operation.

The controller can be configured to define several threshold values corresponding to several operating steps of the system.

The threshold values can for example correspond to a rotational speed of the component driven in rotation by the hydraulic system, for example a rotational speed of an axle.

The illustrated example shows a speed sensor 26, adapted to measure and provide information relative to the rotational speed of the wheels driven by the hydraulic motors 40A and 40B. It is understood that this example is not limiting, and that other sensors or components can be used to define the threshold values.

The threshold values correspond typically to progressive start-up, for which different operating modes can be defined.

By way of example, a first operating mode can be defined for values between 0 rpm and S1 rpm, where S1 is a first threshold value.

This first operating mode translates the start-up of the vehicle and its being set in motion.

For such a method, it is understood that the need for torque is considerable, and also that the speed to be reached, therefore the flow rate to be provided, is very low. Yet, for the electric motor 10, supplying substantial torque with reduced rotational speed would cause a significant risk of overheating. In this way, for this first operating mode, the controller 20 will take control to ensure as a priority that the rotational speed of the electric motor 10 is greater than or equal to the lower threshold value, or typically by retaining a rotational speed of the electric motor 10 which is constant and equal to the lower threshold value.

The displacement of the hydraulic pump 30 is then determined so as to achieve the setpoint value.

Once the first threshold S1 is reached, the controller 20 can present a second operating mode, in which it typically creates control by retaining displacement of the hydraulic pump 30 equal to a constant value, and it increases the rotational speed of the electric motor 10 to create the setpoint value.

This second operating mode can be carried out for example until the electric motor 10 attains its maximal rotational speed, for a second threshold S2.

Once the second threshold S2 is reached, the rotational speed of the electric motor 10 is kept constant and equal to its maximal value, and the controller 20 then controls displacement of the hydraulic pump 30 so as to achieve the setpoint.

Figure 2:
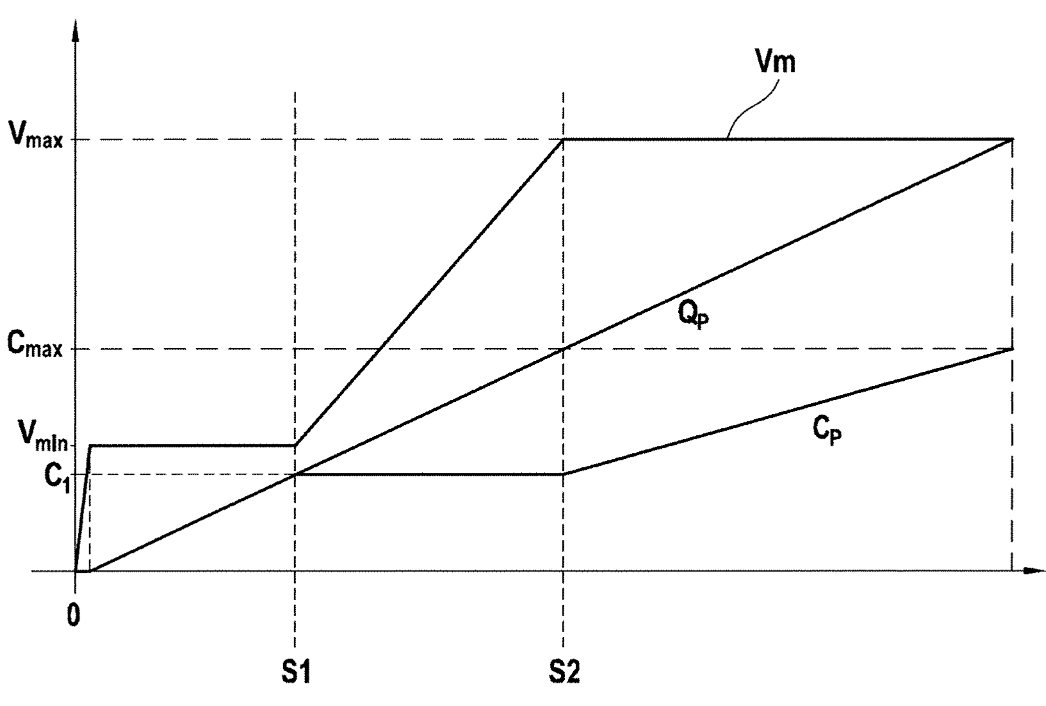
FIG. 2 is a graph which schematically illustrates the control according to an aspect of the invention.

FIG. 2 is a graph which schematically represents these different operating modes.

The abscissa axis here is the evolution of a value of setpoint value, which can correspond to the rotational speed of an axle, for example.

The axis of the ordinates represents the evolution of the rotational speed of the electric motor 10, the flow rate of the hydraulic pump 30 and the displacement of the hydraulic pump 30.

The different curves illustrate the evolution of these different parameters as a function of the setpoint value:

Vm represents the rotational speed of the electric motor 10,

Cp represents the displacement of the hydraulic pump 30, and

Qp represents the flow rate delivered by the hydraulic pump 30.

As seen in this figure, when the system is being put into operation, that is, when the setpoint value becomes greater than 0, the rotational speed Vm of the electric motor 10 rises rapidly to reach the lower threshold value Vmin. The rotational speed Vm of the electric motor 10 then stays constant and equal to Vmin as far as threshold S1. In this first interval, it is the displacement of the hydraulic pump 30 which is modified so as to achieve the preferred flow rate Qp. In the example illustrated, the lower threshold value Vmin is shown as constant. But, as pointed out earlier, the lower threshold value can evolve as a function of temperature. It is therefore understood here that this example is not limiting. According to an example, inasmuch as the rotational speed Vm of the electric motor 10 is less than Vmin, displacement Cp of the hydraulic pump 30 remains zero.

When the setpoint is between S1 and S2, the displacement Cp of the hydraulic pump 30 is kept constant, equal to a value C1. It is the rotational speed Vm of the electric motor 10 which is modified so as to achieve the preferred flow rate Qp.

The value S2 corresponds typically to the setpoint value for which the electric motor 10 attains its maximal rotational speed Vmax. In this way, When the setpoint is greater than S2, the rotational speed Vm of the electric motor 10 remains constant and equal to Vmax, and it is the displacement of the hydraulic pump 30 which is modified so as to achieve the flow rate Qp preferred. Cmax indicates the maximal value of the displacement of the hydraulic pump 30.

By way of variant or in addition, when the setpoint is between S1 and S2 the controller 20 can be configured so as to maximise the output of the hydraulic pump 30 and of the electric motor 10, while maintaining a rotational speed Vm of the electric motor 10 greater than or equal to the lower threshold value Vmin. The controller 20 can for example vary the rotational speed Vm of the electric motor 10 and the displacement Cp of the hydraulic pump 30 to optimise the output irrespective of the setpoint applied or over one or more given ranges of setpoint values, but while maintaining a rotational speed Vm of the electric motor 10 greater than or equal to the lower threshold value Vmin.

By way of a variant or in addition, the controller 20 can be configured so as to maximise the torque delivered by the electric motor 10, while maintaining a rotational speed Vm of the electric motor 10 greater than or equal to the lower threshold value Vmin. The controller 20 can for example vary the rotational speed Vm of the electric motor 10 and the displacement Cp of the hydraulic pump 30 to maximise the torque delivered by the electric motor 10 irrespective of the setpoint applied or over one or more given ranges of setpoint values, but while maintaining a rotational speed Vm of the electric motor 10 greater than or equal to the lower threshold value Vmin.

The controller 20 can be configured so as to alternate between different control modes as a function of the conditions of use, and then prioritise a given parameter.

The present invention also relates to a process for control of a propulsion system for a vehicle axle. An exemplary embodiment of such a control process in reference to FIG. 3 is described hereinbelow.

The propulsion system such as considered comprises a variable displacement hydraulic pump, one or more hydraulic motors fed by the hydraulic pump via a closed-loop hydraulic circuit and adapted to drive one or more axles in rotation. The hydraulic motors are typically fixed displacement hydraulic motors. The propulsion system also comprises an electric motor, adapted to drive the hydraulic pump, a source of electric power, adapted to feed the electric motor, as well as a control component such as a controller which can be linked to sensors and/or memory or information storage units.

Figure 3:
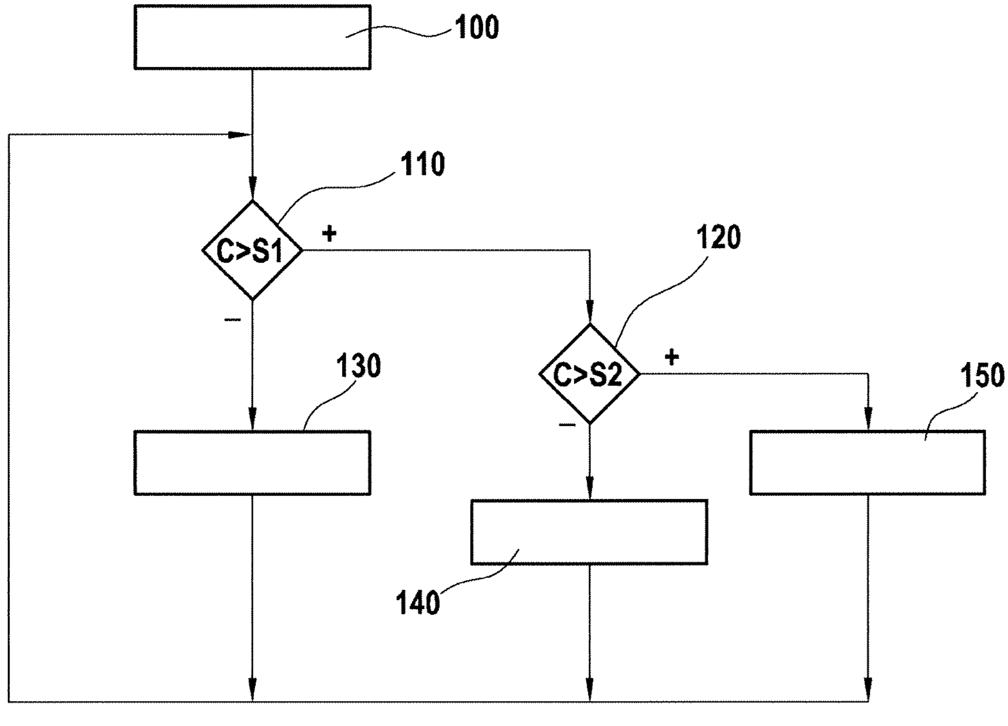
FIG. 3 is a schematic diagram which outlines the steps of a control process according to an aspect of the invention.

FIG. 3 schematically illustrates a process which comprises a first step 100 for application of a setpoint, typically resulting in an action by the user, and which for example will control the start-up of the hydraulic assistance.

The setpoint is typically a speed propulsion setpoint which is reflected by a flow rate setpoint delivered by the hydraulic pump 30, or a rotational speed setpoint for the component driven by the system.

The operating mode is then determined. In FIG. 3 this is reflected by two comparison steps 110 and 120, in which it is determined successively if the setpoint is greater than or not to a first threshold S1, and if it is greater than or not to a second threshold S2.

As a function of the determination made, the control method, adapted as already described especially in reference to FIGS. 1 and 2, will then be applied.

In this way, in the example illustrated, step 130 corresponds typically to the control method wherein the setpoint is between 0 and S1, and wherein it is ensured as a priority that the rotational speed Vm of the electric motor 10 is greater than or equal to the lower threshold value Vmin, or typically while maintaining a rotational speed Vm of the electric motor 10 constant and equal to the lower threshold value Vmin. The displacement Cp of the hydraulic pump 30 is then determined so as to achieve the setpoint.

Step 140 typically corresponds to the control method wherein the setpoint is between S1 and S2, and wherein the displacement Cp of the hydraulic pump 30 is kept constant, equal to a value C1. It is the rotational speed Vm of the electric motor 10 which is modified so as to achieve the preferred flow rate Qp.

Step 140 typically corresponds to the control method wherein the setpoint is greater than S2, and wherein the rotational speed Vm of the electric motor 10 remains constant and equal to Vmax, and it is the displacement of the hydraulic pump 30 which is modified so as to achieve the preferred flow rate Qp.

The process then adapts the control method as a function of the evolution of the setpoint, via a loop on the comparison steps 110.

As pointed out previously, the control can be implemented so as to maximise the total output of the hydraulic pump 30 and of the electric motor 10, while maintaining a rotational speed Vm of the electric motor 10 greater than or equal to the lower threshold value Vmin. The rotational speed Vm of the electric motor 10 and the displacement Cp of the hydraulic pump 30 can then be varied for example to optimise the total output irrespective of the setpoint applied or over one or more given ranges of setpoint values, but while maintaining a rotational speed Vm of the electric motor 10 greater than or equal to the lower threshold value Vmin. For example, with reference to the characteristics of the stored pump and electric motors components, for a preferred flow rate setpoint, the process determines the torque speed of the electric motor—the most advantageous displacement of the pump for good output, in a field of use where the rotational speed Vm of the electric motor 10 is always greater than the lower threshold value Vmin. The process can consider the load of the electric motor. For example if the torque required on the electric motor is excessive, the process helps select a higher rotational speed Vm of the motor and a lesser displacement Cp of the hydraulic pump 30 to achieve a more advantageous overall output.

By way of a variant or in addition, the control can be undertaken so as to maximise the torque delivered by the electric motor 10, while maintaining a rotational speed Vm of the electric motor 10 greater than or equal to the lower threshold value Vmin. The rotational speed Vm of the electric motor 10 and the displacement Cp of the hydraulic pump 30 can be varied for example to maximise the torque delivered by the electric motor 10, irrespective of the setpoint applied or over one or more given ranges of setpoint values, but while maintaining a rotational speed Vm of the electric motor 10 greater than or equal to the lower threshold value Vmin.

The system such as proposed and the associated control process produce non-linear control of the rotational speed of the electric motor and of the displacement of the hydraulic pump over the range of operation.

The system such as proposed can also utilise different other speed torques of electric motor 10 and displacement of hydraulic pump 30, in the range from Vmin to Vmax and from C1 to Cmax, for example to avoid a noise mode, or utilise the components while emphasising economy or power. These control laws can be non-linear as a function of the wheel speed.

The invention such as proposed defines a control for optimising the operation of the electric motor and of the hydraulic pump while protecting the electric motor from any overheating.

Figure 4:
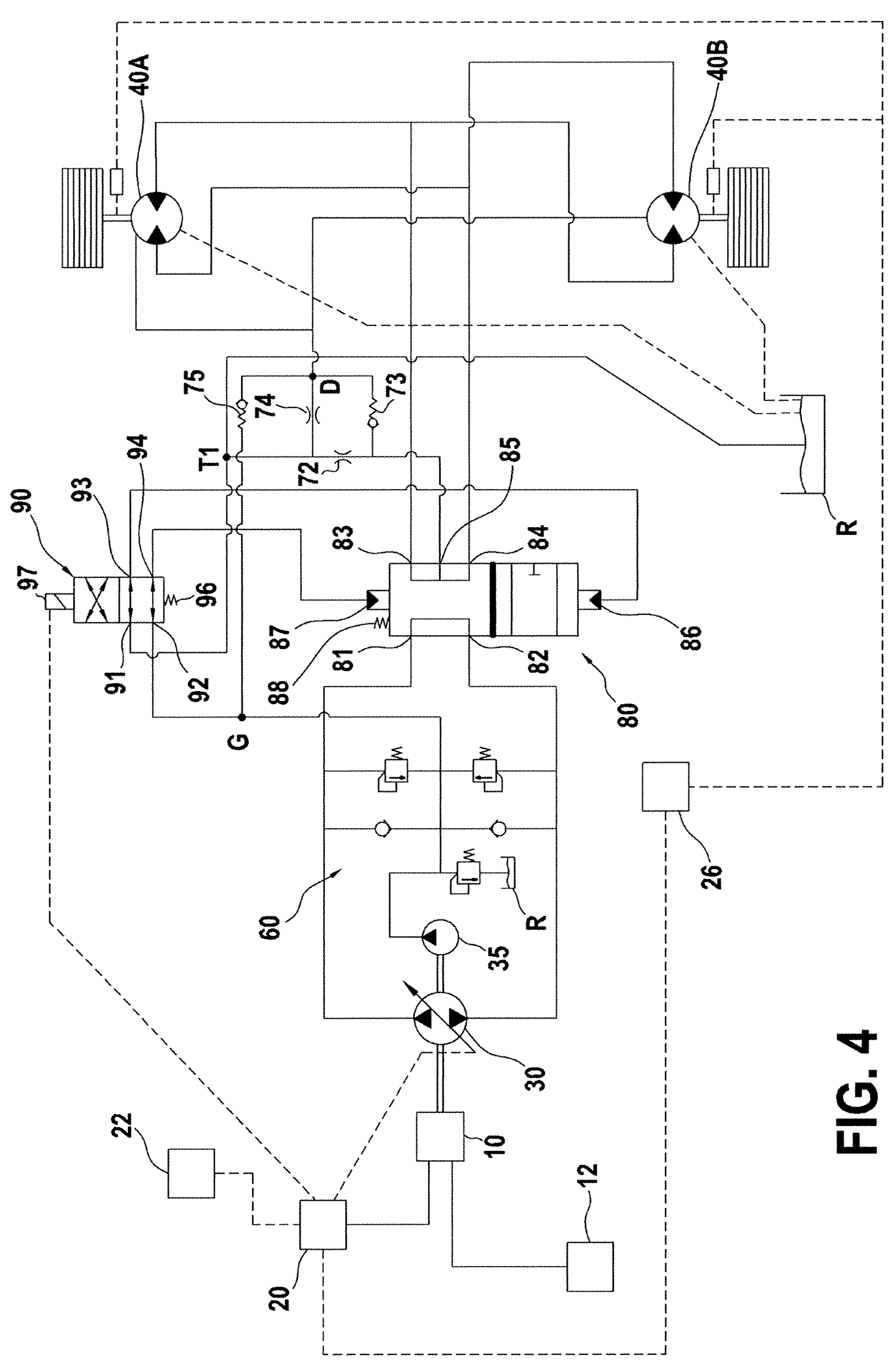
FIG. 4 is a schematic diagram of an example of a system according to an aspect of the invention.

FIG. 4 presents a particular embodiment of a system of electrohydraulic transmission, which can be a main or assistance transmission of a vehicle or an engine, especially an assistance which can be selectively engaged or disengaged.

For those assistances which can be selectively engaged, the hydraulic motors 40 are typically of a type which can disengage from the wheels, in particular of the radial multilobe cam type which can disengage by retractation of the pistons is in the block, when there is no longer pressure on the admission and discharge ports of the motors. Such motors can include retaining springs for pistons in retracted position. A crankcase pressure can aid the return or maintaining of the pistons in a retracted position. Retractation of the pistons releases the pistons from the cam, which deactivate the motor and allows it to rotate without torque, in turn releasing the driven shaft. When pressure on the admission and discharge ports is reset, the pistons exit from their housing and engage on the multilobe cam, connecting the motor to the driven axle. In a disengaged position these motors produce no sensitive drag torque. These motors can be engaged at low pressure, which engages the pistons on the cam, and if they are in equipressure at their admission and discharge ports they can rotate without while torque while being engaged, which creates an operating mode in freewheel, but having a certain drag torque.

This figure shows the elements already described previously in reference to FIG. 1, as well as additional elements which are described hereinbelow.

The hydraulic circuit connecting the hydraulic pump 30 to the hydraulic motors 40A and 40B here comprises a feed circuit 60, fed by a feed pump 35 which is here coupled in rotation to the hydraulic pump 30. It is understood that the feed pump 35 can also be driven in rotation independently of the hydraulic pump 30. The feed circuit 60 also achieves a control pressure for hydraulic controls.

The feed circuit 60 has a known structure and carried out feeding of the hydraulic circuit, or pours out excess fluid into a tank R.

The hydraulic circuit has a control valve 80, interposed between the hydraulic pump 30 and the hydraulic motors 40A and 40B. As previously, it is understood that this embodiment is not limiting, and can be transposed for one or more hydraulic motors mounted for example in series or in parallel.

The engagement valve 80 is a valve of type 5/2, which has 5 ports and two positions.

The engagement valve 80 has:

- a first port 81 connected to a first port of the hydraulic pump 30,
- a second port 82 connected to a second port of the hydraulic pump 30,
- a third port 83 connected to a first port of the hydraulic motors 40A and 40B,
- a fourth port 84 connected to a second port of the hydraulic motors 40A and 40B, and
- a fifth port 85.

The fifth port 85 is connected to a tank R via a restriction 72, to the crankcases of the hydraulic motors 40A and 40B via a calibrated valve 73 and via the restriction 72 and a restriction 74 arranged successively. The crankcases of the hydraulic motors 40A and 40B are connected to the feed circuit 60 via a calibrated valve 75, typically having a calibration of the order of 0.3 bar, allowing a circulation of fluid to the feed circuit 60.

In a first configuration, the first port 81 is connected to the second port 82, whereas the third port 83, the fourth port 84 and the fifth port 85 are connected together. Return means 88 such as a spring keeps the engagement valve 80 by default in its first configuration.

In a second configuration, the first port 81 is connected to the third port 83, the second port 82 is connected to the fourth port 84, and the fifth port 85 is blocked.

In this way, in its first configuration, the engagement valve 80 connects on the one hand the suction and the discharge of the hydraulic pump 30, and on the other hand it connects the suction and the discharge of the hydraulic motors 40A and 40B. In this way it carries out a bypass function best known by the English term "bypass" of the hydraulic pump 30 and a "bypass" of the hydraulic motors 40A and 40B.

In its second configuration, the engagement valve 80 connects the discharge of the hydraulic pump 30 to the suction of the hydraulic motors 40A and 40B, and the discharge of the hydraulic motors 40A and 40B to the suction of the hydraulic pump 30 for a given direction of rotation. The designations of suction and discharge reverse in the inverse direction of travel, therefore flow rate.

The control of the engagement valve 80 is executed by means of two hydraulic controls 86 and 87 in opposition.

The engagement valve 80 is actuated by a control valve 90.

The control valve 90 is a valve of type 4/2, which has 4 ports and two configurations.

The control valve 90 comprises:

- a first port 91 connected to the fifth port 85 of the engagement valve 80 via the restriction 72,
- a second port 92 connected to the feed pump 35 and to the calibrated valve 75,
- a third port 93 connected to the hydraulic control 86,
- a fourth port 94 connected to the hydraulic control 87.

The control valve 90 has a first configuration in which the first port 91 is connected to the third port 93 and the second port 92 is connected to the fourth port 94, and a second configuration in which the first port 91 is connected to the fourth port 94 and the second port 92 is connected to the third port 93.

The control valve 90 is controlled by an actuator 97, here shown as being an electric actuator, opposed by elastic return means 96, typically a spring.

The control valve 90 is by default in its first configuration, which actuates the hydraulic control 87 and positions the engagement valve 80 in its first configuration, that is, a configuration in which the hydraulic motors 40A and 40B are not fed by the hydraulic pump 30.

The actuation of the control 97 toggles the engagement valve 80 in its second configuration. This actuates the hydraulic control 86, and positions the engagement valve 80 in its second configuration, and connects the hydraulic motors 40A and 40B to the hydraulic pump 30.

The present invention proposes improved control for the engagement or the disengagement of the propulsion of the displacement components by the system such as described, as presented hereinbelow.

An initial situation in which the entire system is at a standstill is considered. The electric motor 10 is at a standstill, the pressure is zero in the hydraulic circuit, the control valve 90 and the engagement valve are each in their first configuration.

The electric motor 10 is put into service. As already detailed earlier, the start-up of the electric motor 10 is executed to ensure a higher rotational speed than the lower threshold value Vmin.

The start-up of the electric motor 10 drives the hydraulic pump 30 in rotation, the displacement of which is zero in the event where it concerns a variable displacement hydraulic pump, and the feed pump 35, to set up the feed pressure in the hydraulic circuit. A time delay is typically implemented so as to allow the feed pressure to be set up in the hydraulic circuit due to start-up of the feed pump 35.

It is understood that in the event where the feed pump 35 is driven by a separate element, or independently of the hydraulic pump 30, the feed pump 35 is engaged prior to the engagement or displacement of the hydraulic pump 30. For example, the feed pump 35 can be activated by a separate electric motor, which constitutes an independent electro-pump group. In this way, in the event where the feed pump 35 is driven by another element, the latter is typically put into service initially, before the electric motor 10 is started up. In this way, start-up of the electric motor 10 and of the hydraulic pump 30 on the one hand and of the feed pump 35 on the other hand can be simultaneous or sequential, according to the configuration of the system.

Putting the feed pump 35 into service means setting a pressure in the hydraulic loop to the side of the hydraulic pump 30 via feed check valves on the two hydraulic lines, and executing the control pressure, for example for displacement control of the hydraulic pump 30, and for the control of the engagement valve 80 via the control valve 90.

The displacement of the hydraulic pump 30 and/or the rotational speed of the electric motor 10 is then adjusted to supply a flow rate corresponding to a setpoint value applied to the hydraulic motors 40. This setpoint value corresponds typically to the flow rate that would be needed for the system to recopy the speed of the vehicle which is driven by its transmission, and therefore ensures no motor torque on the wheels.

Since the hydraulic pump 30 and the hydraulic motors 40A and 40B are in a bypass situation, the pressure in the circuit is equal to or substantially equal to the feed pressure, or typically between 5 and 20 bar.

The control 97 is actuated to toggle the control valve 90 in its second configuration, which toggles the engagement valve 80 in its second is configuration, such that the hydraulic motors 40 are fed by the hydraulic pump 30, in the process starting up the hydraulic motors 40, and if needed withdrawing the pistons of the hydraulic motor 40 from their housings in the case of a hydraulic motor, the pistons of which can be retracted into their respective housings to achieve a freewheel configuration, as opposed to an engaged configuration in which the pistons are in contact with a multilobe cam or a plate. The excess in pressure in the crankcase of the hydraulic motors 40A and 40B is purged via the restriction 74 and/or the calibrated valve 75, the latter reinjecting the pressure from the crankcases into the feed circuit 60. Since the hydraulic motors 40A and 40B are engaged, and the flow rate being provided is substantially equal to the displacement speed of the vehicle, the hydraulic circuit is supplying no torque and sensitive traction force. The pressure typically is set up to 80 bar, which defines a situation where the assistance is engaged but in a waiting situation. The setpoint value can be given for a lower pressure, for example 40 bar, in a situation of deceleration or braking of the vehicle. This control can be refined by adjustment using the data from a pressure sensor. Then, when the assistance is used, a setpoint value slightly greater than the speed of advancement of the vehicle, or a pressure control towards higher pressures supplies sensitive traction force, which puts the assistance in effective traction mode. The pressure can rise typically up to 400 bar. As a function of the applied setpoint value, the displacement of the hydraulic pump 30 is then controlled and the rotational speed of the electric motor 10 for example as described previously especially in reference to FIGS. 2 and 3, to adapt to rolling of the vehicle.

It is understood that in the event where the feed pump 35 is driven by separate element, or independently of the hydraulic pump 30, the feed pump 35 is then engaged prior to engagement or displacement of the hydraulic pump 30.

In the case of hydraulic assistance on a secondary axle of a vehicle having a primary axle driven in rotation by a principal propulsion system, the setpoint value applied to the system typically aims to synchronise the rotational speed of the secondary axle with that of the primary axle. The rotational speed of the electric motor 10 and the displacement of the hydraulic pump 30 are typically controlled so as to achieve this setpoint value, while a rotational speed of the electric motor 10 greater than the lower threshold value Vmin as described previously is maintained.

A sequence for disengagement of the system will now be described.

An initial situation is considered in which the system is engaged, and the displacement components are driven by the hydraulic motors 40A and 40B, given that the speed can be zero.

Firstly, displacement of the hydraulic pump and/or the rotational speed of the electric motor is controlled so as to lower the pressure in the hydraulic circuit to reach a resting pressure. This resting or waiting position corresponds to a travel mode in which the hydraulic motors are engaged, but are not supplying torque. The pressure in the circuit is very low, typically 80 bar.

Next, the control 97 of the control valve 90 is disengaged. The control valve 90 is now returned to its first configuration, which will also return the engagement valve 80 to its first configuration.

The engagement valve 80 in its first configuration isolates the hydraulic motors 40 of the hydraulic pump 30. This will cause a drop in pressure in the circuit, the pressure settling at the level of the feed pressure, and if needed this will produce a retractation effect of the pistons in their housings. In fact, when the engagement valve 80 toggles in its first configuration, the hydraulic motors 40 are driven in rotation by the displacement components, typically the wheels or the axles, but are no longer supplied with pressure. This causes a rise in pressure at the discharge of the hydraulic motors 40. The fluid discharged in this way passes through the engagement valve 80, and comes back out via the fifth port 85 before being poured off into the tank R via the restriction 72. Due to the presence of the restriction 72, some of the flow rate will pass through the calibrated valve 73, which typically has a calibration of the order of 0.3 bar. Since the calibrated valve 73 is attached to the crankcases of the hydraulic motors 40, the flow rate which passes through this calibrated valve 73 will cause a rise in pressure in the crankcases of the hydraulic motors 40, and accordingly produce a retractation effect of the pistons of the hydraulic motors 40 in their housings.

The hydraulic motors 40A and 40B are fitted for example with return elements such as springs which tend to position the pistons in their retracted configuration. In this way, in the absence of applied pressure which will cause the pistons to extend from their housings, the latter are retracted and the hydraulic motors have zero displacement.

A time delay can be executed here for example to ensure retraction of the pistons.

Because the hydraulic pump 30 is a variable displacement hydraulic pump, the displacement of the hydraulic pump 30 is controlled so as to bring it to zero displacement. The electric motor 10 is kept at a rotational speed greater than the lower threshold value Vmin.

The electric motor is then stopped, causing stoppage of the hydraulic pump 30, then if needed the feed system is stopped when the feed pump 35 is driven by another motor element.

The system and the process such as shown present an operation which does not require driving a pump when the system is disengaged. It also ensures protection of the different components, and synchronising of the rotational speed in the case of an assistance transmission.

Even though the present invention has been described in reference to specific embodiments, it is evident that modifications and changes can be made to these examples without departing from the overall scope of the invention such as defined by the claims. In particular, individual characteristics of the different embodiments as illustrated and/or mentioned can be combined into additional embodiments. Consequently, the description and the drawings must be considered in an illustrative, rather than restrictive, sense.

It is also evident that all the characteristics described in reference to a process are transposable, singly or in combination, to a device, and inversely, all the characteristics described in reference to a device are transposable, singly or in combination, to a process.

The invention claimed is:

1. A process for start-up of a secondary propulsion system for a vehicle displacement component, the vehicle comprising a primary propulsion system, said primary propulsion system comprising a variable displacement hydraulic pump having a discharge and an admission, a hydraulic motor having a discharge and an admission, adapted to drive said displacement component in rotation and which can be selectively engaged or disengaged from said displacement component, the hydraulic motor being fed by the hydraulic pump via a closed-loop hydraulic circuit comprising a feed pump, the hydraulic circuit comprising an engagement valve adapted to selectively connect hydraulic motor to the hydraulic pump or isolate the hydraulic motor relative to the hydraulic pump and connect the discharge of the hydraulic pump to its admission, and connect the discharge of the hydraulic motor to its admission, an electric motor, adapted to drive the hydraulic pump, a source of electric power, adapted to feed the electric motor, said process for start-up comprising the following steps, given a configuration when the propulsion system is at a standstill, in which the electric motor, the hydraulic pump and the feed pump are at a standstill, and the hydraulic motor is disengaged:

start-up of the feed pump starting up of the electric motor, so as to drive the hydraulic pump in rotation, adjustment of the displacement of the hydraulic pump and/or of the rotational speed of the electric motor to provide a flow rate corresponding to a setpoint applied to the hydraulic motor, control of the engagement valve to execute start-up of the hydraulic motor.

2. The process according to claim 1, wherein the engagement valve has three ports connected to the hydraulic motor, and is adapted to connect the admission and the discharge of the hydraulic motor to a crankcase of the hydraulic motor and to a feed circuit of the hydraulic circuit, the hydraulic motor being of disengagement type by the retractation of pistons in a cylinder block.

3. The process according to claim 2, wherein the hydraulic motor is fitted with return springs tending to position the pistons in a retracted position in the cylinder blocks.

4. The process according to claim 1, wherein the setpoint applied during adjustment of the displacement corresponds to a speed of advance of the vehicle such that the hydraulic motor provides no torque.

5. The process according to claim 1, wherein following control of the engagement valve, a setpoint is applied to the system such that the hydraulic motor provides non-zero traction torque.

6. The process according to claim 1, wherein the feed pump is driven in rotation by the electric motor, and wherein starting up of the electric motor is executed so as to put the feed pump into service.

7. The process according to claim 1, wherein the feed pump is an electro-pump group independent of the electric motor.

8. The process according to claim 1, wherein the displacement of the hydraulic pump and the rotational speed of the electric motor are controlled so as to create a setpoint and maintain a rotational speed of the electric motor greater than a lower threshold value.

9. The process according to claim 8, wherein the displacement of the hydraulic pump and the rotational speed of the electric motor are controlled so as to produce the setpoint by maximizing the total output of the hydraulic pump and of the electric motor while maintaining a rotational speed of the electric motor greater than the lower threshold value.

10. The process for start-up according to claim 1, comprising also the following steps for disengagement of the propulsion system, given an engaged configuration of the propulsion system, in which the electric motor is in rotation, the hydraulic pump and the feed pump deliver a flow rate, and the hydraulic motor is engaged and drives the displacement component in rotation:

control of the displacement of the hydraulic pump and/or of the rotational speed of the electric motor so as to lower the pressure in the hydraulic circuit to achieve a resting pressure, control of the engagement valve so as to isolate the hydraulic motor from the hydraulic pump, zero displacement of the hydraulic pump and shutdown of the electric motor, shutdown of the feed pump.

11. The process according to claim 10, wherein the displacement of the hydraulic pump and the rotational speed of the electric motor are controlled so as to maintain a rotational speed of the electric motor greater than a lower threshold value up to the shutdown step of the electric motor.

12. The process according to claim 10, wherein the resting pressure is determined such that the hydraulic motor applies zero torque.

* * * * *